United States Patent Office 3,412,229
Patented Nov. 19, 1968

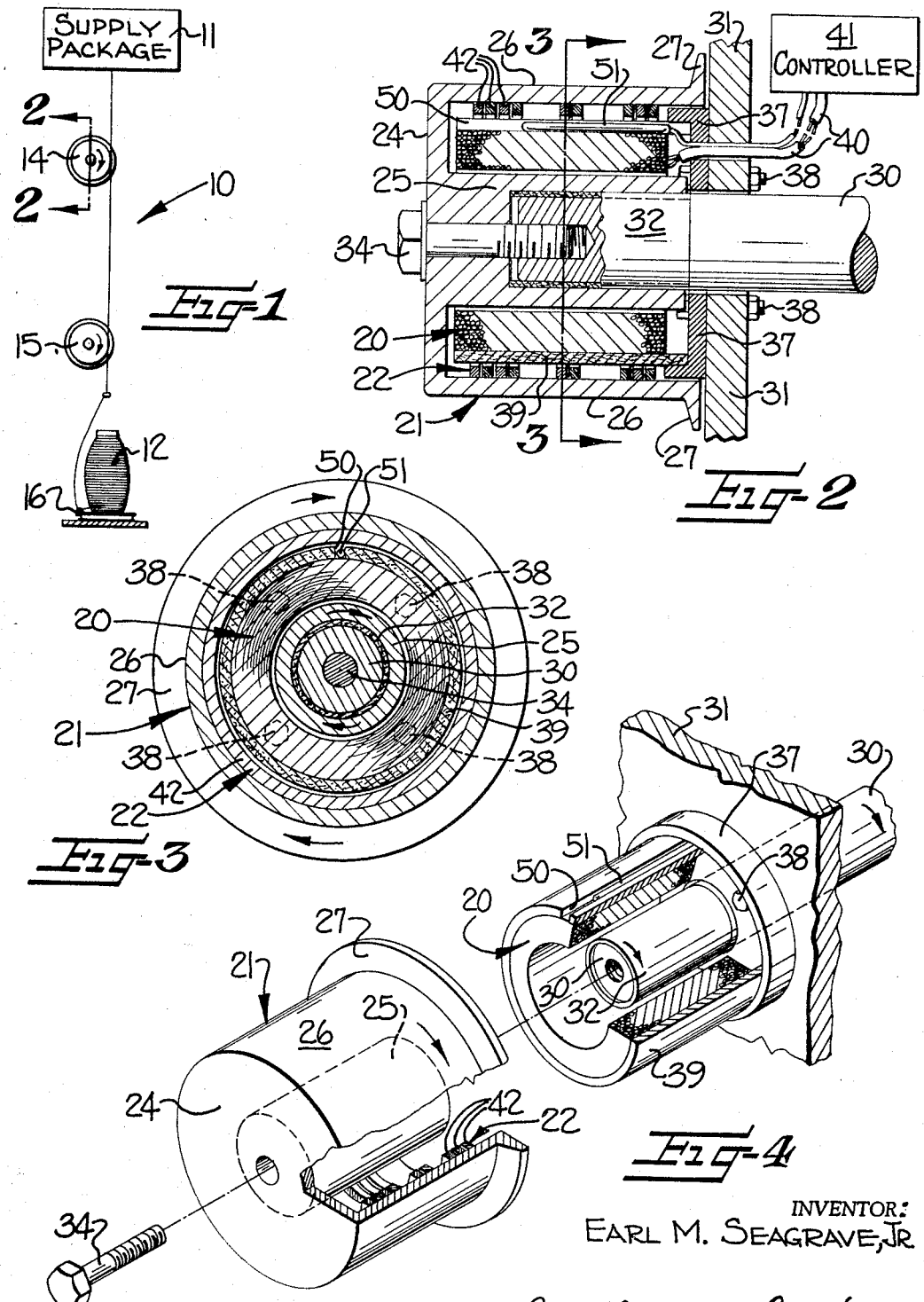

3,412,229
ELECTRIC HEATING MEANS
Earl M. Seagrave, Jr., Charlotte, N.C., assignor, by mesne assignments, to Cameron-Brown Capital Corporation, Raleigh, N.C., a corporation of North Carolina
Filed Oct. 20, 1966, Ser. No. 588,201
4 Claims. (Cl. 219—10.61)

ABSTRACT OF THE DISCLOSURE

Means or heating an article of indeterminate length as the article is advanced in contact therewith wherein an alternating magnetic flux is passed through a rotatable ferromagnetic shell in a predetermined direction and means are provided for intercepting the flux upon alternation thereof, for generating heat in response to a flow of current thusly induced therein, and for conducting such heat to the surface of the rotatable shell.

---

This invention relates to improved means for heating articles of indeterminate length and, more particularly, to means such as a headed roll having a surface which is quickly heated to a desired operating temperature while the degree and profile of such temperature is accurately controlled.

Heated rollers are commonly used in many industrial processes for heated articles of indeterminate length as they are advanced in contact with such rollers. One example of an industrial application of such rollers is in connection with so-called draw twisters which are used in the manufacture of synthetic yarns for drawing or drafting the yarn. In such an application, the yarn is continuously passed one or more times around a heated roll surface to heat the yarn to a desired temperature.

Heated rollers which have heretofore been commercially practicable are broadly classifiable as of two major types. In the first type, heat is transferred to the roll surface through the use of some medium such as oil or steam; stored and heated at some remote heat source and circulated to the roller. In the second type, heat is transferred to the roll surface without reliance on an intermediate medium circulated between the roller and a remote heat source.

Both of these types are subject to many difficulties and deficiencies. For example, in the first type wherein a circulated medium is used to effect heat transfer, the quantity of material to be heated introduces an inherent thermal inertia and requires either that the heat source be at a temperature substantially higher than that necessary at the roll surface or that the system be slowly heated to the desired operating temperature. In either event, serious difficulties of control over the temperature of the roller and of general efficiency are introduced. Also, the circulation of heat transfer medium between stationary and rotating machine elements introduces increased mechanical complexity and maintenance problems into the circulation systems.

In the second type, one approach involves the use of a stationary heat source positioned within the roller itself. This approach relies upon radiation and convection transfer of heat, and the high thermal impedance which must be overcome in such transfer between the heat source and the roller shell presents control difficulties similar to those present in heated rollers of the first type as mentioned above. Another approach employs a heat source rotatable with the roller shell, typically converting electrical energy to heat energy. This apporach presents a basic problem in transferring electrical energy between stationary and rotating machine elements, which in turn raises significant difficulties by increased mechanical complexity. Still another approach, which has been heretofore suggested, proposes that heat be generated in the roller shell by magnetic hysteresis loss and/or by eddy current losses. However, this suggested approach generally is inefficient in the conversion of electrical energy to heat energy, and moreover, quite difficult to control.

While the above described types of heating means have been used from time to time and to greater or lesser extents due to the need for heated rollers, none has yet satisfactorily solved a problem common to all of them, namely, the proper profiling of temperatures along the article contacting surface. Those heating means briefly described above provide no effective control over the temperatures of incremental areas of a heated roll surface, and thus, significant variations in temperature across such a roll surface are inherent in all such systems.

With the aforementioned difficulties and deficiencies in heated rollers particularly in mind, it is an object of this invention to provide a means for heating an article of indeterminate length, such as a heated roller, which is efficiently and quickly heated to an operating temperature, easily controlled to maintain the desired operating temperature under varying loads, and readily adaptable to obtain a desired profile of temperatures along the article contacting heating surface. In accomplishing this object, the heated roller arrangement of this invention avoids the difficulties and deficiencies described above by generating heat in response to current induced in a closed electrical circuit means carried by a roller shell, which current is induced by the interception of alternating magnetic flux substantially confined to a predetermined low reluctance flux path provided by the roll itself. The closed electrical circuit means is rotatable with the shell and positioned in heat conductive relationship with the article contacting surface of the shell, thereby avoiding both the thermal and mechanical complexities inherent in prior systems. In the present invention, heating of the roller shell proceeds promptly upon energization of a stationary transformer primary coil, which acts as a means for generating magnetic flux, and is readily controlled by varying applied voltage. By controlling the location of a plurality of individual shorted turns which form the electrical circuit means carried by the shell, heat may be generated at selected locations along the roller shell to thus obtain very accurate control over the temperature profile along the shell.

Some of the objects of the invention having been stated, other objects will appear as the description proceeds, when taken in connection with the accompanying drawings, in which:

FIGURE 1 is a schematic representation of a synthetic yarn draw twister incorporating a heated roller in accordance with this invention;

FIGURE 2 is an elevation view, partly in section and partly schematic, of a heated roller incorporated in the draw twister of FIGURE 1, taken substantially along the line 2—2 in that figure;

FIGURE 3 is a section view through the heated roller of FIGURE 2, taken substantially along the line 3—3 in that figure; and FIGURE 4 is an exploded perspective view, in partial section, of the heated roller of FIGURE 2.

Referring now more particularly to the drawing, a draw twister for use in the processing of synethetic textile yarns is schematically illustrated in FIGURE 1 and generally indicated at 10. Such a draw twister advances an article of indeterminate length, textile yarn, from a supply package 11 to a take-up package 12, passing the yarn in contact with a feed roller 14, a draw roller 15 and through a twist ring 16. The feed and draw rollers 14 and 15 may be heated or at ambient temperature, as may be desired for the particular draw twister, and in the configuration here illustrated are heated rollers. Where both rollers are at ambient temperature, some other heating means, outside the scope of this invention, is conventionally provided. The feed roller 14 is also shown in FIGURES 2-4 to which reference will hereinafter be made for a more detailed explanation of this invention.

Briefly, this invention, as will be described more fully hereinafter, comprises means for generating an alternating magnetic flux, indicated generally at 20; a rotatable ferromagnetic shell, indicated generally at 21, having a roll surface adapted to be contacted by the yarn and which is magnetically coupled to the flux generating means to provide a predetermined low reluctance flux path; and means for intercepting the flux, generating heat and conducting such heat to the surface of the shell 21, indicated generally at 22. The flux intercepting, heat generating and conducting means 22 is carried by the shell 21 and comprises a closed electrical circuit having an impedance lower than that of the shell and being positioned generally perpendicular to the flux path provided by the shell 21, so that a current is induced therein. Further, this means 22 is in heat conducting relationship with the surface of the shell for conducting to that surface heat generated in response to the flow of induced current therein.

The shell 21, preferably formed of steel or some other ferrous material suitable for transformer core operation, is closed at one end thereof by an end portion 24, and has a central mounting projection 25 with a bore therein and an outer surface portion 26 terminating remote from the closed end 24 in a flange 27. The mounting projection 25 and the outer surface portion 26 define therebetween an interior volume, which is occupied by the flux generating means 20 as will be described more fully hereinafter.

In order to mount the rotatable hollow ferrous shell 21 for rotation about a predetermined axis coincident with an axis of revolution of the roll surface configuration, this invention provides a mounting shaft 30, which is supported by any suitable bearing means (not shown), and penetrates a machine bulkhead 31. The shaft 30 may be operatively connected to a source of rotating power, if desired, to drive the shell 21 in rotation as necessary, and the support means for the shaft 30 and drive means which may be operatively connected thereto form no major part of this invention and thus will not be described in detail. The terminal end portion of the shaft 30, extending outwardly of the machine bulkhead 31, penetrates within the mounting projection 25 of the roller shell 21, and is substantially thermally insulated from the body of the roller shell 21 by an interposed tubular member 32 of a plastic or fiber material. The roller shell 21 is secured to the terminal end portion of the shaft 30 by suitable means including a bolt 34 penetrating the closed end portion 24 of the roller shell 21 and received within a threaded bore in the terminal end portion of the shaft 30.

In order to generate an alternating magnetic flux which passes along low reluctance paths including the rotatable hollow ferrous shell 21, there is provided a stationary means 20, preferably in the form of a transformer primary winding adapted for connection to a source of alternating current voltage so as to generate an alternating electromagnetic flux field. The relative position of the shell 21 with respect to the flux generating means 20 is such that the alternating magnetic flux is directed along paths which pass through the shell 21 in planes parallel to the rotational axis of the shell 21, as defined by the shaft 30. The transformer primary winding is interposed between the outer surface portion 26 and the inner mounting projection 25 of the roller shell 21, and is fixed relative thereto by mounting to the machine bulkhead 31 through the use of a mounting plate 37, fixed to the bulkhead by a plurality of bolts 38 penetrating therethrough. A tubular member 39 of suitable plastic or phenolic material is fixed to the plate 37 and serves to thermally and electrically insulate the electromagnetic coil to the flux generating means 20 from the elements of the heating arrangement located radially outwardly thereof, as described more fully herebelow. The tubular member 39 also serves to support the primary winding in the proper position encircling the shaft 30 and the mounting projection 25 of the roller shell 21. Inasmuch as the electromagnetic coil is thus mounted stationary from the machine bulkhead 31, electrical conductors 40 may readily be brought from the stationary winding through the bulkhead 31 for connection to a controller 41, as will be described more fully hereinafter.

The mounting plate 37 is also of ferrous material, such as steel, and cooperates with the shell 21 in defining flux paths and thereby substantially confining the alternating magnetic flux resulting from energization of the electromagnetic coil. The air gaps between the plate 37 and the shell 21, at the exposed extremity of the mounting projection 25 and at the flange portion 27, are minimized in order to assure that a low reluctance magnetic circuit is provided.

In order to generate heat within an element rotating with the roller shell 21 in response to a current induced by interception of the magnetic flux flowing through the shell 21 from the primary winding, and to conduct such heat to the roll surface, this invention provides the aforementioned means 22 which comprises at least one closed electrical circuit carried by the shell 21. Preferably, a plurality of closed electrical circuits are provided by electrically conductive shorted transformer secondaries, each of which has an impedance lower than that of the shell 21 and is positioned generally perpendicular to the flux path. This positioning of the transformer secondaries relative to the magnetic flux results, in accordance with elementary laws of electricity, in the induction of electrical current in the secondaries, and reference to the secondaries as "intercepting" the flux refers to such an operative relationship as will give rise to an induced current flowing in the transformer secondaries. With the impedance of the transformer secondaries being lower than that of the shell 21, the effect of current flow induced in the transformer secondaries is substantially greater than other effects which may be present to a minor degree, such as hysteresis loss or eddy current loss.

The heat generated in the transformer secondary means by the resistance thereof to the flow of the secondary current which is induced therein is conducted therefrom to the shell 21 and thus to the article contacting roll surface of the shell. To obtain this heat transfer, while retaining the most efficient operation of the transformer secondaries, the closed electrical circuits comprising the secondaries are carried on the inner surface of the roller shell 21. The transfer of heat from the transformer secondary means 22 to the roller shell 21 by conduction, without the need of mechanical complexity to apply electrical current thereto from a stationary machine element, is a particular advantage obtained through the use of transformer-type operation in the heated roller construction of this invention.

In order to provide for ready conduction of heat from the transformer secondaries to the roller shell 21, and for convenience in manufacture, the transformer secondary means 22 preferably comprises a plurality of individual copper rings 42, each having an outside diameter sufficient to frictionally engage the inner surface of the shell 21 and an internal diameter sufficient to permit rotation clear of the tubular member 39 (as shown in FIGURE 2). While shown of square configuration, the cross-sectional configuration of the individual rings 42 may vary, in order to obtain varying heating effects. The position of each of the plurality of individual rings 42 within the shell 21 is such that each ring is generally concentric with the shaft 30 and generally perpendicular to the path of the alternating magnetic flux, for interception of the flux and induction of a secondary current in each ring. Each ring 42 is thus heated by the resistance of the same to the flow of the secondary current, and this heat is conducted directly to the immediately adjacent portion of the shell 21.

By varying the positions of each of the individual copper rings 42 within the shell 21, and varying the particular resistance of the ring to the flow of secondary current induced therein, the locations at which heat is applied to the shell 21 and the quantity of heat generated at each location may be controlled. Preferably, each ring 42 is located at a selected position within the shell 21, in order to obtain a desired profile of temperature conditions along the material contacting surface of the roller shell 21. Temperature profiles obtained in this manner may be substantially even across the entire contact surface of the roller shell, or may provide desired temperature differentials between various locations along the contact surface.

In order to provide for control of temperature conditions at the surface of the roller shell 21, this invention provides a control means 41 which is electrically operatively connected to the transformer primary winding 20 for varying the intensity of the alternating magnetic flux generated thereby. The control means 41 preferably controls the magnitude of voltage applied to the primary winding, and thus in turn varies the magnitude of voltage induced in the transformer secondary means 22. While any of a large number of presently commercially available controls may be used in conjunction with controlling voltage applied to the transformer primary winding, it is preferred to use a solid state narrow band proportional controller, which employs controlled rectifiers to effectively vary an output voltage in accordance with the resistance changes of a sensor means.

In order to avoid the necessity of transmitting electrical current through slip rings and brushes in controlling the heated roll construction of this invention, a groove 50 is provided in the insulating tubular member 39, and a resistance sensor element 51 of a type wherein the resistance of the element varies with changes of temperature is positioned in the groove 50. The close spacial relationship of the resistance sensor 51 to the secondary rings 42, and the temperature dependent resistance characteristics of the sensor device 51, provide a resistance which varies closely in coordination to the temperature of the secondaries from which heat is conducted to the roll surface of the shell 21 and thus a signal on which the control 41 may operate to vary the magnitude of the voltage applied to the stationary electromagnetic coil. Preferably, the resistance sensor element 51 is a platinum resistance sensor.

In summary, it should be readily apparent that the present invention provides a simple and efficient system for heating such devices as rollers with extreme accuracy and versatility while avoiding the complexities and problems prevalent in prior heated roll constructions.

In the drawings and specification there has been set forth a preferred embodiment of the invention and, although specific terms are employed, they are used in a generic and descriptive sense only, and not for purposes of limitation, the scope of the invention being defined in the claims.

I claim:
1. A heated roll construction for heating a moving article of indeterminate length comprising:
(a) a shaft mounted for rotation about its axis,
(b) a hollow ferrous shell having an inner surface, an outer roll surface adapted to be contacted by articles to be heated and a central mounting projection having a bore therein for receiving said shaft, said shell being mounted on said shaft for rotation therewith,
(c) a transformer primary winding positioned between said shaft and said inner surface of said shell and adapted to be connected to a source of alternating current voltage for generating an alternating magnetic flux,
(d) stationary means encircling said shaft and positioned closely adjacent said shell for supporting said primary winding, said stationary means and said shell cooperating to define a predetermined low reluctance path for said magnetic flux in planes parallel to the axes of rotation of said shaft and said shell and including said central mounting projection, and
(e) at least one independent closed electrical circuit defining transformer secondary carried by the inner surface of said shell for rotation therewith relative to said primary winding and positioned generally perpendicular to said flux path for intercepting said flux upon alternation thereof to induce current therein, said secondary generating heat in response to the flow of current therein and being in heat conductive relation to said roll surface to conduct such heat thereto.

2. A heated roll construction as claimed in claim 1 further comprising sensor means interposed between said primary winding and said secondary for sensing the temperature condition of said secondary and operatively electrically connected to said primary winding for controlling the voltage applied thereto in response to sensed temperature conditions.

3. A heated roll construction as claimed in claim 1 wherein a plurality of secondaries are carried by said shell, each of which is an individual ring concentric with and positioned in intimate contact with the inner surface of said shell, said rings being positioned at selected points to provide a predetermined temperature profile on said roll surface.

4. A heated roll construction as claimed in claim 1 further comprising first thermal insulating means interposed between said shaft and said shell and second thermal insulating means interposed between said primary winding and said secondaries, so that the transfer of heat from said shell to said shaft and from said secondaries to said primary winding is substantially impeded.

References Cited
UNITED STATES PATENTS

| 607,093 | 7/1898 | Snow | 219—10.79 X |
| 3,008,026 | 11/1961 | Kennedy | 219—10.61 |
| 3,187,150 | 6/1965 | France | 219—10.61 X |
| 3,200,230 | 8/1965 | De La Bretoniere | 219—10.61 X |
| 3,265,851 | 8/1966 | Schroeder | 219—10.49 |

FOREIGN PATENTS

| 858,855 | 1/1961 | Great Britain. |
| 1,454,363 | 8/1966 | France. |

RICHARD M. WOOD, *Primary Examiner.*

L. H. BENDER, *Assistant Examiner.*

UNITED STATES PATENT OFFICE
CERTIFICATE OF CORRECTION

Patent No. 3,412,229                      November 19, 1968

Earl M. Seagrave, Jr.

It is certified that error appears in the above identified patent and that said Letters Patent are hereby corrected as shown below:

Column 1, line 11, "or" should read -- for --; line 23, "headed" should read -- heated --; line 28, "heated" should read -- heating --; line 69, "apporach" should read -- approach --. Column 6, line 19, after "defining" insert -- a --.

Signed and sealed this 10th day of March 1970.

(SEAL)
Attest:

Edward M. Fletcher, Jr.                    WILLIAM E. SCHUYLER, JR.
Attesting Officer                              Commissioner of Patents